Sept. 13, 1932. H. AUSTIN 1,876,587
CHANGE SPEED GEAR FOR MOTOR VEHICLES
Filed July 20, 1929
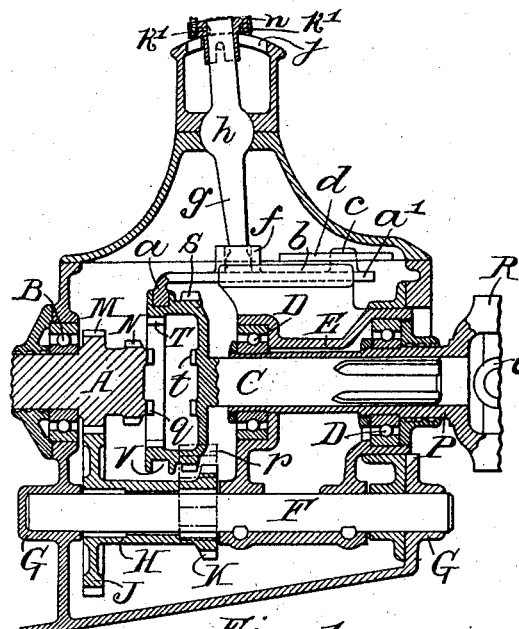
Fig. 1.
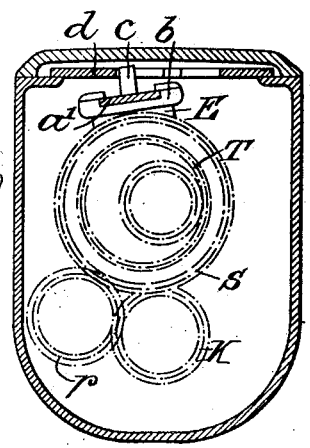
Fig. 4.
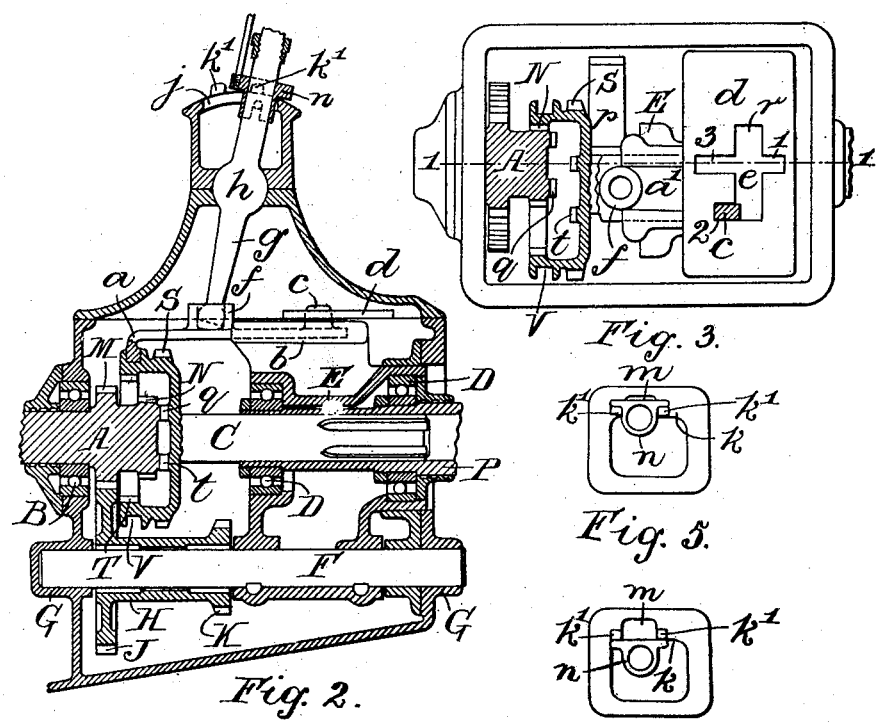
Fig. 2.
Fig. 3.
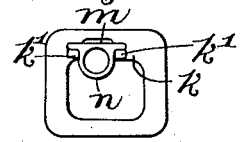
Fig. 5.
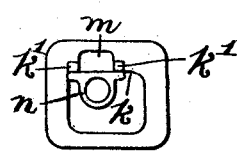
Fig. 6.
Inventor:
Herbert Austin
By
Pennie Davis Marvin + Edmonds
attorneys Patented Sept. 13, 1932

1,876,587

UNITED STATES PATENT OFFICE

HERBERT AUSTIN, OF BROMSGROVE, ENGLAND

CHANGE SPEED GEAR FOR MOTOR VEHICLES

Application filed July 20, 1929, Serial No. 379,764, and in Great Britain August 16, 1928.

This invention relates to change speed gears for motor vehicles of the type in which an externally toothed wheel on one of the shafts is arranged to be engaged with, and disengaged from, an internally toothed wheel of another shaft by lateral movement of the one shaft in relation to the other; and has for its object to provide a gear of this type which is easy to change and is silent in running on the speeds which are in normal use.

According to the main feature of the invention, means are provided whereby the one shaft can be rocked to cause it to move laterally in relation to the other shaft while remaining parallel thereto.

According to another important feature of the invention, a lay shaft is provided parallel to the other shafts, driven by one of them and having an externally toothed wheel adapted to be brought into engagement with an externally toothed wheel of the shaft which carries the internally toothed wheel; and preferably the latter shaft is turnably mounted in a block which is pivoted to rock about the axis of the lay shaft.

The invention also comprises the arrangement and disposition of the gear locking means hereinafter described.

In a convenient embodiment of the invention, the driven shaft of the gear is rotatably mounted in a block which can be swung about the axis of a lay shaft and moved endwise in relation to the driving shaft, and preferably also endwise in relation to the lay shaft. On the end of the driven shaft which is towards the corresponding end of the driving shaft there is formed or mounted a wheel having internal teeth adapted to engage with an externally toothed wheel on the corresponding end of the driving shaft, but the diameter of the pitch-line of this latter wheel is less than the diameter of the pitch line of the internally toothed wheel, so that the toothed wheel on the driven shaft engages with that on the driving shaft only when the block is swung to one side, the teeth of the wheels being clear of each other when the two shafts are co-axial.

The ends of the driving and driven shafts which are presented towards each other are provided with counter-part clutch members which become engaged for direct drive when the block carrying the driven shaft is moved endwise towards the driving shaft and co-axial therewith. The said external teeth of the driving shaft may, if desired, be utilized as one of the clutch members, or dogs of the usual kind may be employed.

When the gear is changed from top, or direct drive, to the next gear below, the block is first moved in a direction away from the driving shaft and then swung out to one side to allow the internal and external rings of teeth to engage with each other. In this way two silent gears are obtained, as the direct drive is, of course, silent; and the gearing together of an internal and external ring of teeth provides a quieter drive than the gearing together of two externally toothed wheels.

Another speed may be obtained through the agency of the lay shaft driven from the driving shaft in the usual manner, and external teeth on the driven shaft may be brought into engagement with the corresponding teeth of the lay shaft by moving the block back in a direction away from the driving shaft.

A reverse speed may be arranged by swinging the block in the direction opposite to that in which it is swung for engaging the internal and the external teeth as above described. This can be arranged by utilizing the external teeth of the driven shaft already referred to and causing them to be swung into engagement with an intermediate wheel driven by external teeth of a wheel on the lay shaft.

In order that the invention may be clearly understood, a convenient embodiment thereof is described with reference to the drawing herewith in which:—

Figure 1 is a vertical longitudinal section of a change speed gear constructed according to the invention, the section being taken in the plane indicated by the line 1, 1, of Figure 3. In this view the gear is shown as in neutral.

Figure 2 is a sectional view corresponding to Figure 1, but showing the gear as in third or top speed.

Figure 3 is a part sectional plan view showing the gear in second speed.

Figure 4 is a transverse section, in somewhat diagrammatic form, and as seen looking from the front, showing the gear in reverse; and, Figures 5 and 6 are detail views to illustrate means for guarding the reverse and keeping the gear wheels engaged when in their reverse positions.

In the drawing:—A is the driving shaft journalled in a bearing B and connected with the clutch centre not shown. C is a driven shaft turning in bearings D D of a block E which is keyed to a shaft F mounted for angular movement in bearings G G of the casing, whereby the block E together with the shaft C can be rocked about the axis of the shaft F. Turning about the shaft F is a sleeve constituting the lay shaft H having two integral gear wheels J and K. The wheel J is constantly in mesh with a toothed wheel M integral with the shaft A and the latter has, at its forward end, another integral toothed wheel N.

The driven shaft C is splined within, and is movable endwise in relation to, a sleeve P which is coupled to the Cardan shaft Q through an universal joint R (see Figure 1); and the shaft C, at its forward end, is enlarged to a cup form and has, on its outer periphery, a wheel S with external teeth. A wheel T having internal teeth is formed on its inner periphery, and the least diameter of such wheel is greater than the maximum diameter of the wheel N so that the latter when co-axial with the wheel T is entirely clear thereof. The cup has also a groove V for the engagement therewith of a selector fork $a$ carried by a slider $a'$ which is arranged to be slid endwise in a guide $b$ formed in the top of the block E. The slider $a'$ has an upward projection or peg $c$ which enters a gate $d$ (see Figure 3) with four notches, 1 for first speed, 2 for second, 3 for third and $r$ for reverse; but the latter is constituted as an extension of a transverse passage $e$ of the gate. Integral with the fork slider $a$ is a cup $f$ in which engages the ball foot of a change speed lever $g$ having a ball fulcrum $h$. The casing is extended up above the ball centre and terminates in an opening $j$. At the right hand side of the opening, as seen from the rear, and placed towards the front, are two upward projections $k'$ (see especially Figures 5 and 6) from an inward lip $k$; but between the projections is a gap $m$ to allow the lever to be moved to the reverse position. Surrounding the lever is a slider $n$ which normally encounters the projections to prevent the lever being moved to reverse; but the slider may be lifted by the usual reverse control hand lever when it can pass over the projections and be lowered again beyond them to retain the gear in reverse. There is a considerable advantage in providing the gear locking means, as shown, on the side of the driven shaft remote from the axis about which it is rocked as any play in the locking means is imparted in a less degree to the movable shaft.

Mounted on a separate shaft, parallel with the lay shaft, is a gear wheel $p$ (see Figure 4) which is constantly in mesh with the wheel K of the lay shaft, but the wheel $p$ is of sufficient breadth to be engaged also by the exterior teeth of the wheel S when the shaft C is in the endwise position shown in Figure 1, and is rocked to the position shown in Figure 4.

The shafts A and C are each provided with dogs $q$, $t$, respectively which are engaged together for top gear.

The action is as follows:—

In the position shown in Figure 1, the gear is in neutral and the projection $c$ is in the middle of the passage $e$ of the gate $d$, the block E being vertical. It will be seen that the dogs $q$ and $t$ are out of engagement, the wheels S and K are out of engagement and also the wheels N and T. Also the wheel S is out of engagement with the reverse wheel $p$.

For the first speed the lever is pressed straight forward when the projection $c$ enters the notch 1 and brings the wheel S back into mesh with the wheel K of the lay shaft, while the other parts remain out of engagement.

For second speed the lever is moved to neutral and then to the left as seen from the front and afterwards back. This causes the projection $c$ to enter the passage $e$, move along to the right as seen from the front and enter the notch 2. This rocks the block E to the right, the opposite way to that shown in Figure 4, and causes the internal teeth of the wheel T first to come opposite the teeth of the wheel N, on the left hand side as seen from the front, and then to move endwise into engagement therewith.

Although, as above described, the last movement of the shaft C is such as to cause the teeth of the wheels to engage endwise, this is not essential; but it is preferred because it is not considered advisable to bring the wheels radially into contact while the vehicle is travelling.

For third or top speed, the lever is brought to neutral and then moved back in a vertical plane. This causes the projection $c$ to enter the notch 3, while the shaft C is moved fully forward, the dogs $q$ and $t$ coming into engagement while all the other parts are out of engagement.

For reverse the lever is moved to neutral and then rocked to the left as seen from the front bringing the projection $c$ into the notch $r$; the slider $n$ being lifted to clear the projections $k'$, allowing the lever to enter the gap $m$. This rocks the block E to the position shown in Figure 4 and brings the wheel S into engagement with the reverse wheel $p$ as shown in such figure. The position of this wheel $p$ is indicated by broken lines in Figure 1.

Having fully described my invention, what I claim and desire to secure by Letters Patent, is:—

1. A change speed gear comprising a main driving shaft, a main driven shaft, an externally toothed wheel rigid with one of said shafts, an internally toothed wheel rigid with the other of said shafts, means whereby the one shaft is maintained parallel to the other, a lay shaft parallel to the other shafts and driven from one of said shafts, an externally toothed wheel rigid with said lay shaft, an externally toothed wheel on the other said main shaft and means whereby the one main shaft can be rocked in one direction to allow said internally toothed wheel of the one shaft to be brought into engagement with the externally toothed wheel of the other shaft, and means whereby said shaft which is adapted to be rocked may also be moved endwise to bring said externally toothed wheel thereof into engagement with said externally toothed wheel of said lay shaft.

2. A change speed gear comprising a main driving shaft, a main driven shaft, an externally toothed wheel on one of said shafts, an internally toothed wheel on the other of said shafts, means whereby the one shaft can be rocked to cause it to move laterally in relation to the other shaft, means whereby the one shaft is maintained parallel to the other, a lay shaft parallel to the other shafts and driven from one of said shafts, an externally toothed wheel on said lay shaft, an externally toothed wheel on the other main shaft, means whereby said externally toothed wheel can be brought into engagement with and disengaged from said wheel on said lay shaft, a reversing shaft, a toothed wheel on said reversing shaft meshing with said wheel on said lay shaft and means whereby said driven shaft can be rocked in a direction to bring its externally toothed wheel into engagement with the toothed wheel of said reversing shaft.

3. A change speed gear comprising a driving shaft, a driven shaft, an externally toothed wheel on one of the shafts, an internally toothed wheel on the other of said shafts, a mounting for one of said shafts, an axis parallel to said shaft and about which said shaft is adapted to be rocked, means whereby said movable shaft may be moved endwise in relation to said mounting, a guide for said mounting, a slide adapted to slide within said guide and being coupled to said movable shaft in a manner to impart endwise movement thereto, a peg on said slide, a gate fixed in relation to the gear box and with which said peg engages and means for moving said slide endwise and laterally.

4. A change speed gear comprising a main driving shaft, a main driven shaft, an externally toothed wheel on one of said shafts, an internally toothed wheel on the other of said shafts, means whereby the one shaft can be rocked to cause it to move laterally in relation to the other shaft, means whereby the one shaft is maintained parallel to the other, a lay shaft parallel to the other shafts and driven from one of said shafts, an externally toothed wheel on said lay shaft an externally toothed wheel on the other main shaft, means whereby the toothed wheel on the other main shaft can be brought into engagement with and disengaged from the wheel on the said lay shaft, a reversing shaft, a toothed wheel on said reversing shaft meshing with said wheel on said lay shaft and means whereby the one main shaft can be rocked in a direction to bring its externally toothed wheel into engagement with the toothed wheel of said reversing shaft, a lever by which said movable shaft can be moved lengthwise or rocked, a detent on said lever, a fixed stop which is encountered by said detent to prevent said movable shaft being rocked inadvertently to reverse position, and means whereby said detent may be lifted to pass over said stop and lowered again at the other side thereof to hold the gear in the reverse position.

5. A change speed gear comprising a main driving shaft, a main driven shaft, an externally toothed wheel rigid with said driving shaft, an internally toothed wheel rigid with said driven shaft, means whereby the one shaft is maintained parallel to the other, a lay shaft parallel to the other shafts and driven from said driving shaft, an externally toothed wheel rigid with said lay shaft, an externally toothed wheel rigid with said driven shaft, means whereby said driven shaft can be rocked in one direction to allow said internally toothed wheel of said driven shaft to be brought into engagement with said externally toothed wheel of said driving shaft and means whereby said driven shaft can be moved endwise to bring said externally toothed wheel thereof into engagement with said externally toothed wheel of said lay shaft.

6. A change speed gear comprising a main driving shaft, a main driven shaft, an externally toothed wheel rigid with one of said shafts, an internally toothed wheel rigid with the other said shafts, means whereby the one shaft is maintained parallel to the other, a lay shaft parallel to the other shafts and driven from one of said shafts, an externally toothed wheel rigid with said lay shaft, an externally toothed wheel rigid with said other main shaft, means whereby the one main shaft can be rocked in one direction to allow said internally toothed wheel thereof to be brought into engagement with said externally toothed wheel of said other main shaft, means whereby said externally toothed wheel of said shaft which is adapted to be rocked may be brought into engagement with said externally toothed wheel of said lay shaft, clutch members on the opposing ends of said driving and driven shafts, and means whereby said shaft which is adapted to be rocked may also be moved endwise to cause its clutch member to engage directly with the clutch member of said other main shaft to procure direct drive.

7. A change speed gear comprising a main driving shaft, a main driven shaft, an externally toothed wheel on one of said shafts, an internally toothed wheel on the other of said shafts, means whereby the one shaft can be rocked to cause it to move laterally in relation to the other shaft, means whereby the one shaft is maintained parallel to the other, a lay shaft parallel to the other shafts and driven from one of said shafts, an externally toothed wheel on said lay shaft, an externally toothed wheel rigid with the other main shaft, and means whereby said other main shaft can be moved endwise to bring its externally toothed wheel into engagement with and disengagement from the wheel on the said lay shaft.

8. A change speed gear comprising a main driving shaft, a main driven shaft, an externally toothed wheel on one of said shafts, an internally toothed wheel on the other of said shafts, means whereby the one shaft can be rocked to cause it to move laterally in relation to the other shaft, means whereby the one shaft can be moved endwise to bring the teeth of said wheels endwise into engagement when said shafts are out of alignment, means whereby the one shaft is maintained parallel to the other, a lay shaft parallel to the other shafts and driven from one of said shafts, an externally toothed wheel on said lay shaft, an externally toothed wheel on the other main shaft and means whereby the latter toothed wheel can be brought endwise into and out of engagement with the toothed wheel on said lay shaft.

9. A change speed gear comprising a main driving shaft, an externally toothed wheel rigid with said driving shaft, a main driven shaft, an internally toothed wheel rigid with said driven shaft, means whereby the driven shaft can be rocked to cause it to move laterally in relation to the driving shaft to bring the internally toothed wheel to such position as to adapt its teeth to be brought endwise into engagement with the teeth of said externally toothed wheel, means for moving said driven shaft endwise to cause such engagement, means for maintaining the shafts parallel to each other, a lay shaft parallel to the other shafts and driven from said driving shaft, an externally toothed wheel on said lay shaft, an externally toothed wheel on the driven shaft, and means whereby said externally toothed wheel on said driven shaft can be brought endwise into engagement with said externally toothed wheel on said lay shaft.

10. A change speed gear comprising a main driving shaft, an externally toothed wheel rigid with said driving shaft, a main driven shaft, an internally toothed wheel rigid with said driven shaft, means whereby the driven shaft can be rocked to cause it to move laterally in relation to the driving shaft to bring the internally toothed wheel to such position as to adapt its teeth to be brought endwise into engagement with the teeth of said externally toothed wheel, means for moving said driven shaft endwise to cause such engagement, means for maintaining the shafts parallel to each other, a lay shaft parallel to the other shafts and driven from said driving shaft, an externally toothed wheel rigid with said lay shaft, an externally toothed wheel rigid with said driven shaft and means whereby said driven shaft can be moved endwise to cause said externally toothed wheel thereof to engage endwise with said externally toothed wheel of said lay shaft.

11. A change speed gear comprising a main driving shaft, a main driven shaft, an externally toothed wheel on one of said shafts, an internally toothed wheel on the other of said shafts, means whereby the said driven shaft can be rocked to cause it to move laterally in relation to the driving shaft, means for maintaining the said shafts parallel, a lay shaft parallel to the other shafts, an externally toothed wheel rigid with said lay shaft, an externally toothed wheel rigid with said driven shaft, and means whereby said driven shaft may be moved endwise to effect the triple purpose of causing the driven and driving shafts when in alignment to be clutched together for direct drive of causing the said internally toothed wheel of the one main shaft to come endwise into engagement with the externally toothed wheel of the other main shaft after the driven shaft has been rocked to the requisite position and of causing the externally toothed wheel which is rigid with the driven shaft to come into engagement with the externally toothed wheel of the lay shaft.

In witness whereof I have hereunto signed my name this fifth day of July, 1929.

HERBERT AUSTIN.